US006909843B1

(12) United States Patent
Fabrizio

(10) Patent No.: US 6,909,843 B1
(45) Date of Patent: Jun. 21, 2005

(54) ELECTRIC TANKLESS WATER HEATER

(75) Inventor: Edward Vincent Fabrizio, Vernon, CT (US)

(73) Assignee: Eemax Incorporated, Oxford, CT (US)

( * ) Notice: Subject to any disclaimer, the term of this patent is extended or adjusted under 35 U.S.C. 154(b) by 0 days.

(21) Appl. No.: 10/785,813

(22) Filed: Feb. 24, 2004

(51) Int. Cl.[7] ................................................ H05B 3/78
(52) U.S. Cl. ........................................ 392/490; 392/485
(58) Field of Search ............................... 392/465, 485, 392/471, 497, 498

(56) References Cited

U.S. PATENT DOCUMENTS

| | | |
|---|---|---|
| 3,968,346 A | 7/1976 | Cooksley |
| 4,095,087 A * | 6/1978 | Giraud ........................ 392/471 |
| 4,410,791 A | 10/1983 | Eastep |
| 4,439,669 A | 3/1984 | Ryffel |
| 4,567,350 A | 1/1986 | Todd et al. |
| 4,604,515 A | 8/1986 | Davidson |
| 4,638,147 A | 1/1987 | Dytch et al. |
| 4,762,980 A | 8/1988 | Insley |
| 4,900,896 A | 2/1990 | Maus |
| 4,960,976 A | 10/1990 | Insley |
| 5,020,127 A | 5/1991 | Eddas et al. |
| 5,216,743 A | 6/1993 | Seitz |
| 5,222,185 A | 6/1993 | McCord, Jr. |
| 5,325,822 A | 7/1994 | Fernandez |
| 5,408,578 A | 4/1995 | Bolivar |
| 5,437,003 A | 7/1995 | Blanco |
| 5,438,642 A | 8/1995 | Posen |
| 5,440,667 A | 8/1995 | Simpson et al. |
| 5,479,558 A | 12/1995 | White, Jr. et al. |
| 5,504,306 A | 4/1996 | Russell et al. |
| 5,523,550 A | 6/1996 | Kimura |
| 6,061,499 A | 5/2000 | Hlebovy |
| 6,080,971 A | 6/2000 | Seitz et al. |
| 6,167,845 B1 | 1/2001 | Decker et al. |
| 6,240,250 B1 | 5/2001 | Blanco, Jr. |
| 6,389,226 B1 | 5/2002 | Neale et al. |
| 6,574,426 B1 | 6/2003 | Blanco, Jr. |
| 6,640,048 B2 | 10/2003 | Novotny et al. |
| 2001/0048811 A1 | 12/2001 | Waithe et al. |
| 2003/0044173 A1 | 3/2003 | Natsuhara et al. |
| 2003/0113107 A1 | 6/2003 | Winter et al. |
| 2003/0185548 A1 | 10/2003 | Novotny et al. |
| 2003/0206733 A1 | 11/2003 | Hadar |

OTHER PUBLICATIONS

The Wholesaler®, p. 57 (May 2003).

* cited by examiner

Primary Examiner—Thor Campbell
(74) Attorney, Agent, or Firm—Lahive & Cockfield, LLP

(57) ABSTRACT

In various embodiments, the invention provides a system for heating a liquid, such as, for example, water, comprising a plurality of liquid heaters, the inlets and outlets of which are respectively connected in a parallel flow relationship by respective manifolds, and configured to provide liquid having a temperature of greater than about 90 degrees Fahrenheit at a flow rate of greater than about 10 gallons per minute. In various embodiments, the present invention provides an electric tankless liquid heater system capable of delivering hot liquids, and in particular water, at even higher flow rates and or temperatures, including, but not limited to, flow rates greater than about: (1) 12 gpm; (2) 18 gpm; (3) 20 gpm; and (5) 20 gpm; and/or temperatures of greater than about: (1) 100° F.; (2) 120° F.; (3) 140° F.; and (4) 180° F.

18 Claims, 9 Drawing Sheets

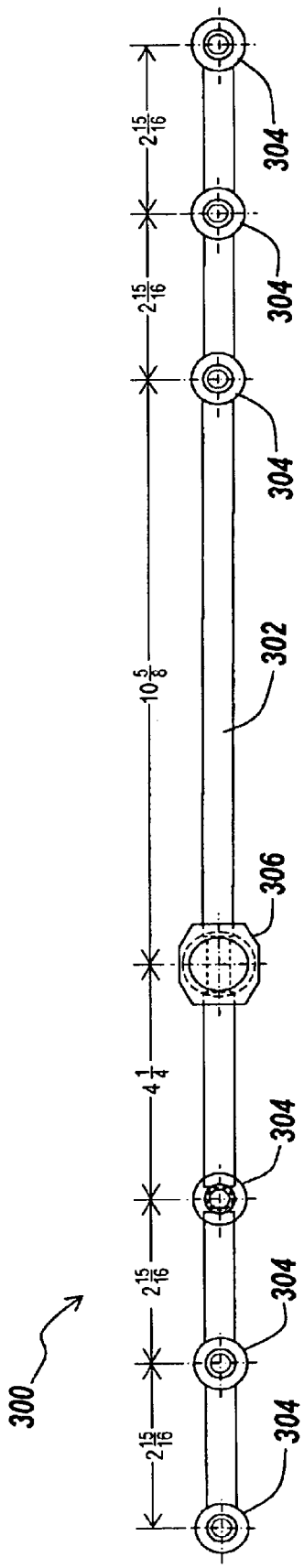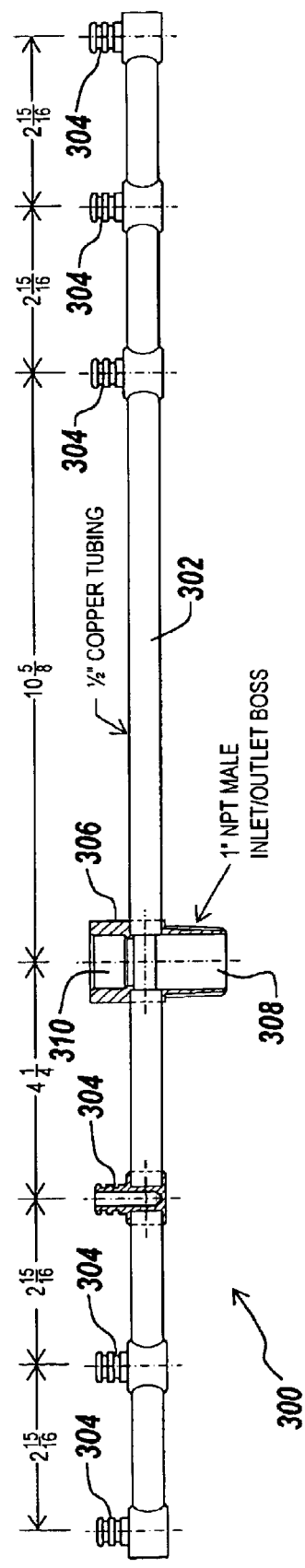

ELECTRIC TANKLESS WATER HEATER

BACKGROUND

The most common approach for providing hot water in both domestic and commercial settings involves the use of large tanks for the storage of hot water. Although such heated tank systems can provide hot water at a relatively high flow rate, they are inherently energy inefficient because the water in the tank is continually reheated even when water is not being used on a regular basis.

Another approach to providing hot water involves the use of a tankless water heater system that heats water only when water is being used. Such tankless water heater systems, also referred to as demand water heater systems, can often provide a more energy efficient means of heating water than storage systems using the same type of heating (e.g., gas, electric, etc.). However, one common draw back of traditional tankless water heater systems is their inability to provide hot water at high flow rates. Typically, traditional tankless water heater systems have difficulty providing domestic hot water (e.g., for showers water with a temperature typically of about 90–100° F. (32–38° C.)) at flow rates greater than about 6 gallons per minute (22.7 liters per minute). These difficulties can be even more pronounced in industrial settings where process hot water is typically water with a temperature of about 140° F. (60° C.) or higher.

There are many uses to which a tankless hot water system capable of delivering hot water at flow rates above 6 gallons per minute (GPM) could be applied. In addition to uses as more energy efficient domestic and industrial hot water supplies, tankless hot water systems with sufficient flow rates could be used to provide hot water for portable, semi-portable or fixed decontamination showers. A heated decontamination shower could prove very useful in situations requiring outdoor decontamination on cold days, for example, in the event of a chemical, biological, and/or nuclear (dirty-bomb) terrorist attack in winter on a Canadian, northern U.S., Russian or northern European city.

A need therefore continues to exist for hot water delivery systems that can provide hot water in a more energy efficient manner than storage tank systems yet still deliver hot water at the higher flow rates associated with storage tank systems.

SUMMARY OF THE INVENTION

The present invention relates to electric tankless liquid heater systems, and in particular, to electric tankless water heater systems using resistive heating elements. In various aspects, the present invention provides an electric tankless water heater system capable of delivering water with a temperature of greater than about 90° F. (about 32° C.) at a flow rate grater than about 10 gpm (about 37.8 liters per minute (lpm)).

In various aspects, the electric tankless water heater comprises a first inlet manifold, a first outlet manifold, and a first plurality of liquid heaters which are connected in a parallel flow relationship by the manifolds. Each of the liquid heaters comprises one or more electrical resistance heating elements for heating the liquid. Preferably, the electrical resistance heating elements are continuous, sheathless, coils having a mechanically stressed portion that bridges a liquid inlet channel and a liquid outlet channel of a liquid heater and an electrically conductive member configured to substantially eliminate current flow through the mechanically stressed portion.

In various aspects, the electric tankless water heater comprises a first plurality of liquid heaters which are connected in a parallel flow relationship by a first inlet manifold, which connects the liquid inlets of the first plurality of liquid heaters, and a first outlet manifold, which connects the liquid outlets of the first plurality of liquid heaters; and a second plurality of liquid heaters which are connected in a parallel flow relationship by a second inlet manifold, which connects the liquid inlets of the second plurality of liquid heaters, and a second outlet manifold, which connects the liquid outlets of the second plurality of liquid heaters. In various embodiments, a valve assembly joins the first inlet manifold to the second inlet manifold, which is to configured open and permit liquid flow into the second inlet manifold in response to a difference in liquid pressure between the first inlet manifold and the second inlet manifold.

There are primarily two types of electrical heating elements traditionally used in water heaters: inductance and resistance. The present invention makes use of electrical resistance heating elements. Electrical resistance heating elements are immersed into the water to be heated. Electrical resistance heating elements heat up as current passes through them and the amount of heat generated is related to the resistance of the element. Heat is then transferred from the heating element to the water.

There are also two primary types of electrical resistance heating elements: sheathed and sheathless. Sheathed electrical resistance heating elements have an electrically insulative sleeve or sheath over a more electrically conductive inner element, such as, e.g., a metal wire. The inner element is heated by passing a current therethrough, and heat is then transferred from the inner element to the water. The sheath serves, for example, to prevent direct physical contact between the water to be heated and the conductive inner element. In comparison, in a sheathless electrical resistance heating element, the portion of the element which is heated by passing a current therethrough, can come into direct physical contact with the liquid being heated.

In the various aspects of the invention, the liquid heaters comprise one or more electrical resistance heating elements for heating the liquid. Preferably, the electrical resistance heating elements are continuous, sheathless, coils having a mechanically stressed portion that bridges a liquid inlet channel and a liquid and a liquid outlet channel of a liquid heater and an electrically conductive member configured to substantially eliminate current flow through the mechanically stressed portion.

In various embodiments, a liquid heater preferably comprises a housing having a liquid inlet channel and a liquid outlet channel, the housing defining a central passage opening into an exterior housing surface, and a heating cartridge resident in the central passage, the heating cartridge supporting interiorly of the housing the one or more electrical resistance heating elements. Preferably, a liquid heater further comprises a flow sensor operably disposed in the liquid inlet channel responsive to the flow rate of the liquid through the liquid inlet channel, and which is configured to prevent energization of the one or more heating elements of a liquid heater when the flow rate through the liquid inlet channel of said liquid heater is below a predetermined flow rate threshold. It is also preferred that a liquid heater further comprise a temperature sensor operably disposed in the liquid outlet channel and a controller configured to regulate electrical current flow to the electrical resistance heating element in response to a signal produced by the temperature sensor.

In various embodiments, an electric tankless liquid heater of the present invention includes a controller, which regulates the current flow to one or more electrical resistance heaters of a liquid heater. In preferred embodiments, the controller regulates electrical current flow to one or more electrical resistance heating elements in response to a signal produced by a temperature sensor, a flow sensor, or both. Preferably, the controller is configured to prevent energizing an electrical resistance heating element of the liquid heater until the flow rate of the liquid through the liquid inlet channel exceeds a predetermined flow rate threshold. In various embodiments of an electric tankless liquid heater of the present invention, electrical current is provided to one or more electrical resistance heating elements through a circuit relay installed in series with one or more switching units.

In various embodiments, the present invention provides an electric tankless liquid heater system capable of delivering hot liquids, and in particular water, at flow rates greater than about: (1) 10 gpm; (2) 12 gpm; (3) 18 gpm; (4) 20 gpm; and/or (5) 24 gpm; and which have a temperature of greater than about: (1) 90° F.; (2) 100° F.; (3) 120° F.; (4) 140° F.; and/or (5) 180° F. Accordingly, in various embodiments, the present invention provides tankless water heaters systems for provisional of domestic hot water, industrial process hot water, drench showers, and decontamination showers.

The foregoing and other aspects, embodiments, and features of the invention can be more fully understood from the following description in conjunction with the accompanying drawings. In the drawings like reference characters generally refer to like features and structural elements throughout the various figures. The drawings are not necessarily to scale, emphasis instead being placed upon illustrating the principles of the invention.

BRIEF DESCRIPTION OF THE DRAWINGS

FIGS. 3A and 3B are detailed views of one embodiment of a manifold.

FIG. 4A is a sectional view, FIG. 4B a side view, FIG. 4C a switching unit side, side view, and FIG. 4D a proximate end, end view of the liquid heater. The various dimensions illustrated in FIGS. 4B and 4C are in inches.

DETAILED DESCRIPTION

Figure 1:
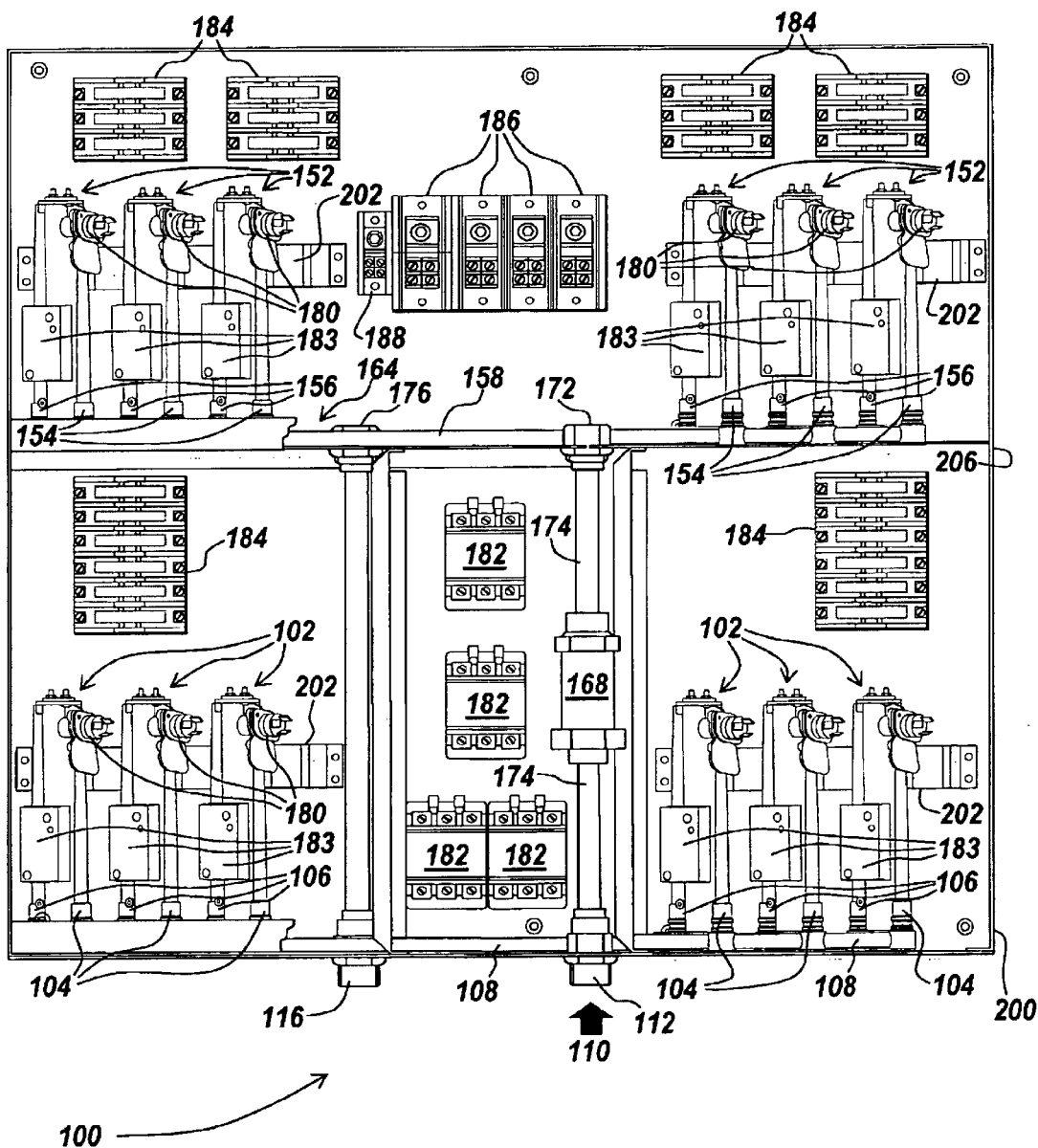
FIG. 1 is an assembly drawing illustrating various embodiments of an electric tankless liquid heater system in accordance with the present invention.
Figure 2:
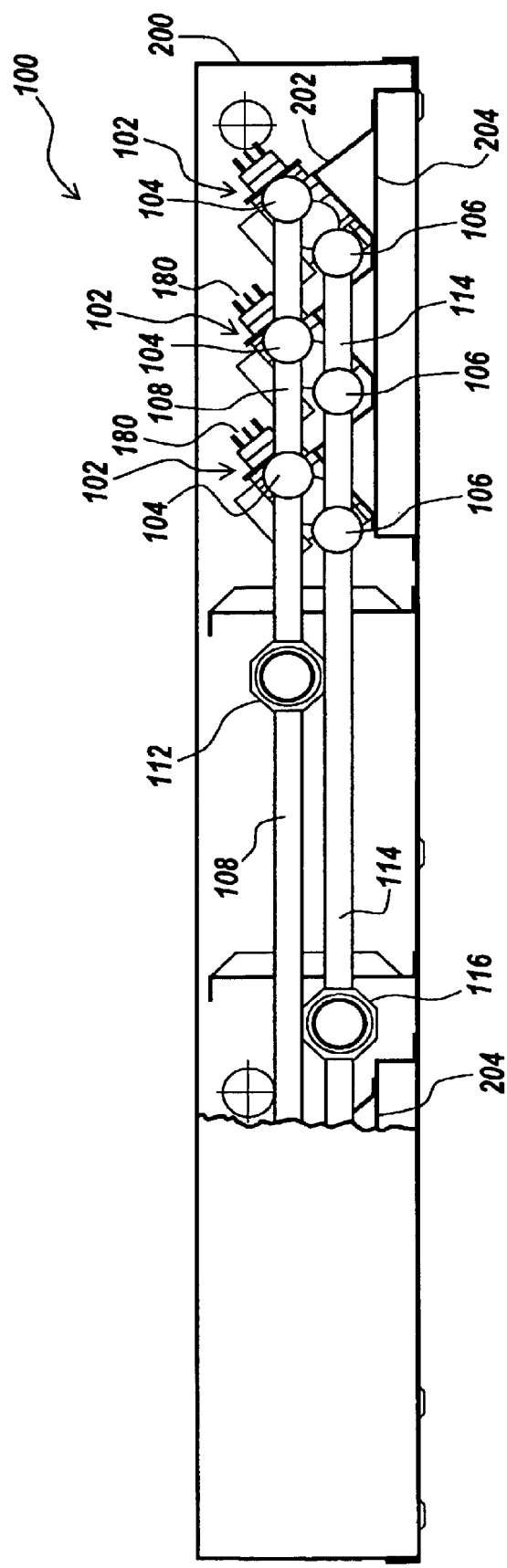
FIG. 2 is a bottom view of the assembly drawing of FIG. 1 with a portion of the housing cut away to illustrate one embodiment of the connection of the inlet and outlet manifolds to the liquid heaters.
Figure 4A:
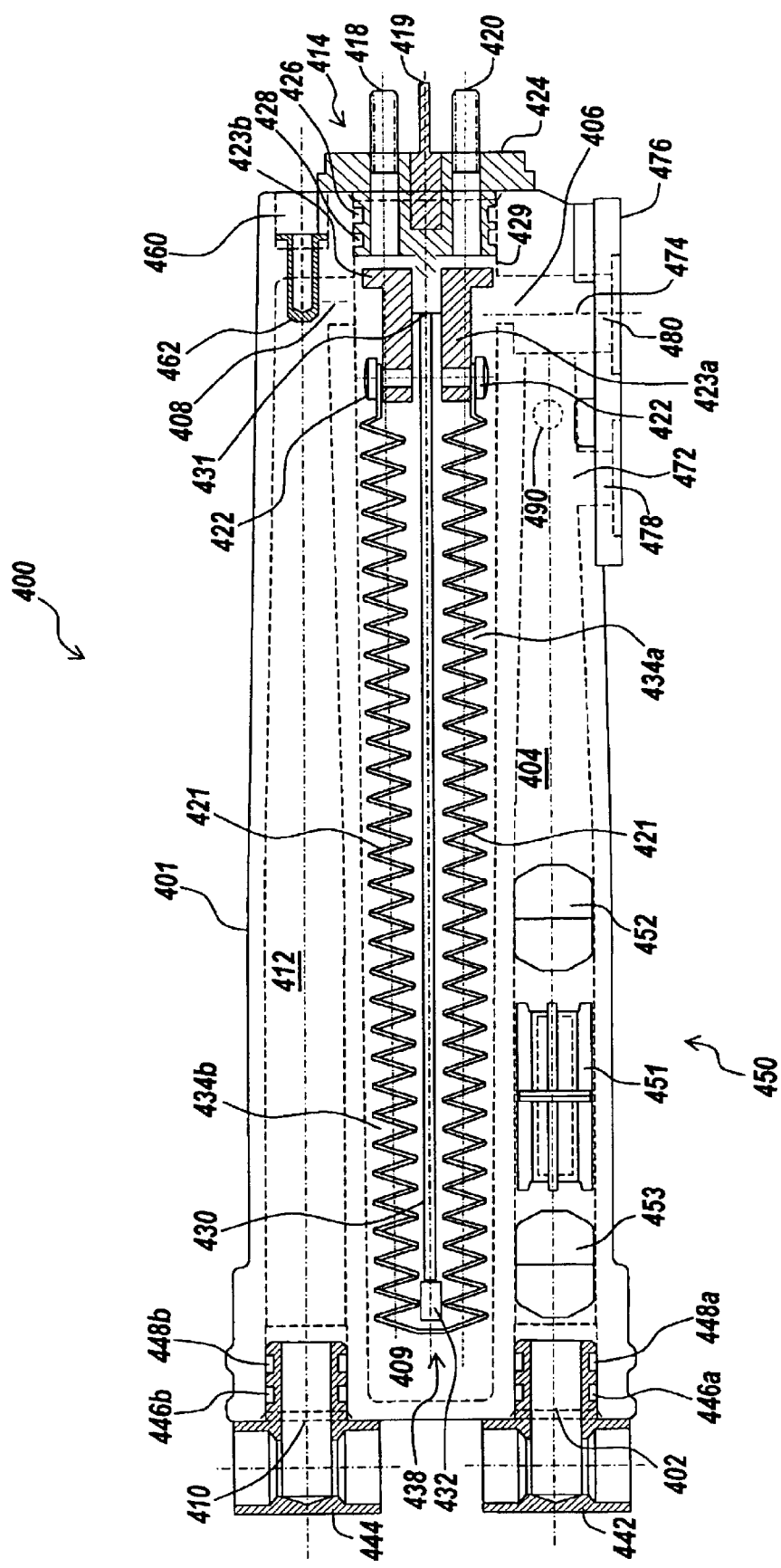
FIGS. 4A–4D are various views of one embodiment of a liquid heater for an electric tankless liquid heater system in accordance with the present invention; where
Figure 4B:
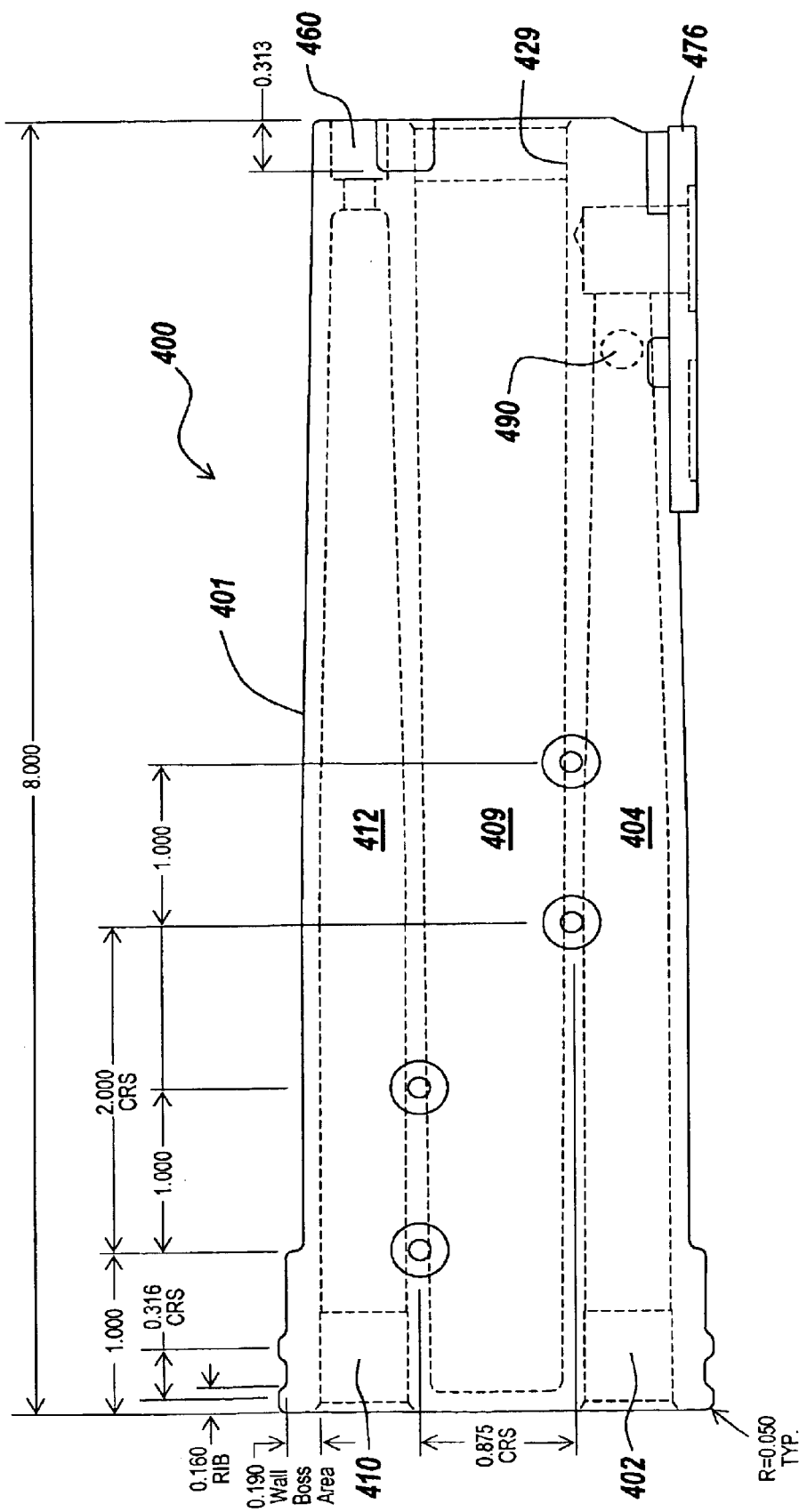
Figure 4C:
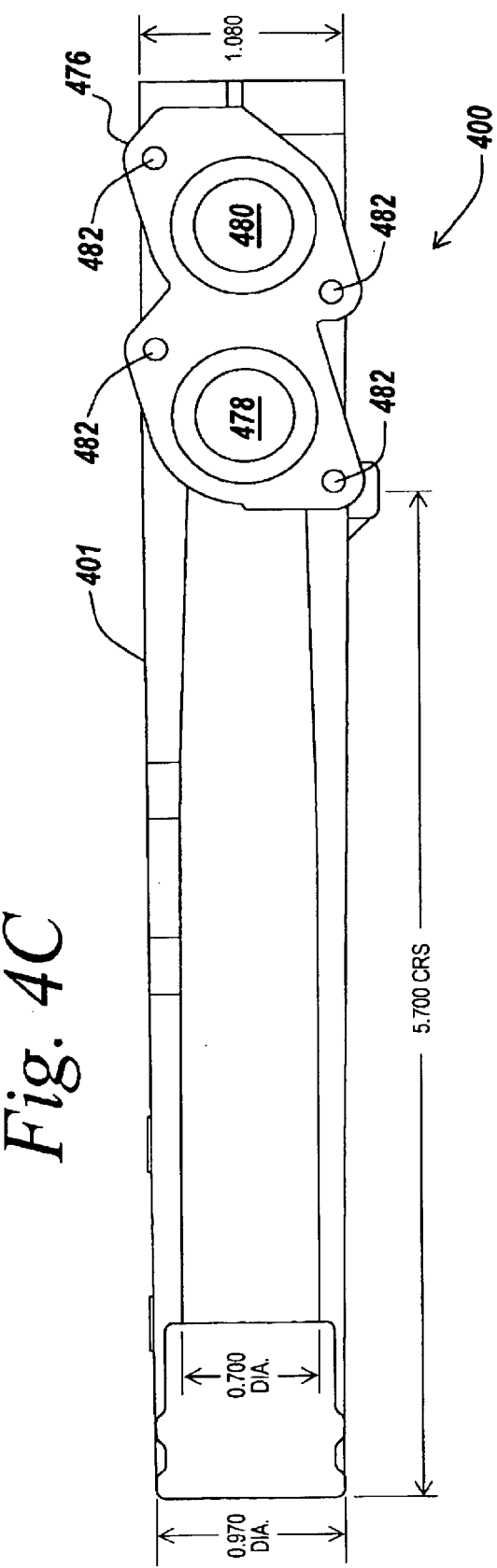
Figure 4D:
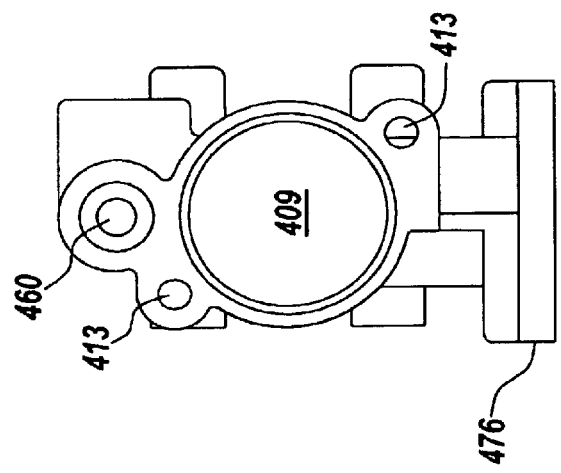

Referring to FIGS. 1 and 2, in various embodiments, a tankless water heater system 100 according to the invention comprises a first plurality of liquid heaters 102 each having a liquid inlet 104 and a liquid outlet 106. The liquid inlets 104 of the liquid heaters 102 are connected in a parallel flow relationship by a first inlet manifold 108, which in turn can be connected to a source of liquid 110 to be heated, such as, e.g., a cold water line, by an inlet manifold connection fitting 112. The liquid outlets 106 of the liquid heaters 102 are connected in a parallel flow relationship by a first outlet manifold 114, which in turn can be connected to a hot liquid supply line by an outlet manifold connection fitting 116.

In various embodiments, where, for example, a higher flow rate is desired, the tankless water heater system 100 further comprises a second plurality of liquid heaters 152, each of the liquid heaters of the second plurality 152 having a liquid inlet 154 and a liquid outlet 156. The liquid inlets 154 of the second plurality of liquid heaters 152 are connected in a parallel flow relationship by a second inlet manifold 158, and the liquid outlets 156 are connected in a parallel flow relationship by a second outlet manifold 164 (behind the second inlet manifold 158 in the view of FIG. 1). The second plurality of liquid heaters 152 can be connected to a source of liquid to be heated by a valve assembly 168 joining the first inlet manifold 108 to the second inlet manifold 158 through a second inlet manifold connection fitting 172 and inlet manifold coupling line 174. Preferably, the valve assembly 168 contains a valve configured to open and permit liquid flow into the second inlet manifold 158 in response to a difference in liquid pressure between the first inlet manifold 108 and the second inlet manifold 158. The valve assembly preferably can isolate the first inlet manifold from the second inlet manifold and provide for a lower flow turn on rate, making, for example, a tankless water heater system of the present invention compatible for use with an emergency eye/face wash and drench shower combination.

The heated liquid provided by one or more of the second plurality of liquid heaters 152 can be provided through the second outlet manifold 164 to an outlet manifold connection fitting 116 by a second outlet manifold connection fitting 176 and an outlet manifold coupling line 178 connecting the second outlet manifold 164 to the first outlet manifold 114. In various embodiments, the outlet manifold coupling line can also include a valve assembly joining the first outlet manifold to the second, which contains a valve configured to open and permit liquid flow into the first outlet manifold 114, hot liquid supply line, or both, in response to a pressure differential across the valve.

In various preferred embodiments, the valve assembly comprises a double check valve configured to open in response to a pressure differential across the valve. In one embodiment, the double check valve is a spring loaded valve containing two springs each selected for a 1.5 pounds per square inch (psi) crack pressure (corresponding to a 3 psi crack pressure for the valve overall), which corresponds to a flow rate of about 9 gpm for a coupling line made of three-quarter inch copper tubing.

Referring again to FIGS. 1 and 2, each liquid heater includes one or more electrical resistance heating elements. The electrical power to the electrical resistance heating elements preferably passes through a switching unit 180 and a circuit relay (also referred to as a contactor) 182. A controller 183, in various embodiments mounted on the liquid heater, regulates the operation of a switching unit 180 and hence the current flow to one or more electrical resistance heaters of a liquid heater. The circuit relays 182, and therethrough one or more switching units, is connected to a source of electrical power through fuse blocks 184, and therethrough to taps in terminal blocks 186, which are connected to a source of electrical power (e.g., line voltage). Preferably, use is also made of a ground terminal block 188. In various embodiments, a circuit relay 182 can be used to regulate electrical current flow to the one or more switching units (and hence to one or more electrical resistance heating elements connected thereto) of multiple liquid heaters.

The controller furnishes an output control signal to a switching unit (such as, e.g., a bi-directional triode thyristor or "triac"), which gates power from a terminal block for selectively energizing one or more electrical resistance heating elements of a liquid heater. Solid state switching units, such as triacs, used alone can have some leakage current as they deteriorate, or if their blocking voltage rating has been exceeded. The present invention thus preferably utilizes a circuit relay installed in series with one or more switching units. In preferred embodiments, the controller regulates electrical current flow to one or more electrical resistance heating elements in response to a signal produced by a temperature sensor, a flow sensor, or both. Preferably, the controller is configured to prevent energizing an electrical resistance heating element of the liquid heater until the flow rate of the liquid through the liquid inlet channel exceeds a predetermined flow rate threshold. In various embodiments, the controller is configured to prevent energizing an electrical resistance heating element of the liquid heater until the flow rate exceeds about 0.5 gpm. Preferably, the liquid heater includes a temperature sensor, operably disposed in a liquid outlet channel of the liquid heater, which provides a signal to the controller for regulating electrical current flow to one or more electrical resistance heating elements and maintaining a desired output liquid temperature for the tankless liquid heater system.

A tankless liquid heater system according to the invention can be mounted in a housing comprising an enclosure 200 containing mounting points for electrical components (for example, circuit relays, fuse blocks, and terminal blocks) in addition to the liquid heaters. In various embodiments, the liquid heaters are mounted to the casing 200 at an angle using angle brackets 202 which in turn are connected to sub-brackets 204 which are directly mounted to the enclosure 200. In one embodiment, comprising a first plurality of six liquid heaters, the casing has the dimensions of about 32 inches wide, by 20 inches high (the height in one version of this embodiment extending approximately to the point marked by the reference numeral 206 in FIG. 1), by about 6 inches deep. In another embodiment, comprising a first plurality of six liquid heaters and a second plurality of six liquid heaters configured substantially as shown in FIGS. 1 and 2, the casing has the dimensions of about 32 inches wide, by 32 inches high, by about 6 inches deep.

FIGS. 3A and 3B provide partial cross-sectional top and side views, respectively, of one embodiment of a manifold suitable for use as an inlet manifold and an outlet manifold. The various dimensions of the illustrated manifold 300 are in inches, and examples of specific fittings (e.g., NPT male) and manifold line materials (e.g., copper tubing) are noted. In general, the manifold comprises a manifold line 302 connecting in a liquid flow relationship heater connection fittings 304 for connecting the manifold to the liquid inlets (when used as an inlet manifold) or liquid outlets (when used as an outlet manifold) of a liquid heater. The manifold further comprises a manifold connection fitting 306 (e.g. a boss having an integrally threaded portion) having an interconnection portion 308 for coupling the manifold to a source of liquid (when used as an inlet manifold) or to a heated liquid supply line (when used as an outlet manifold). In various embodiments, the manifold connection fitting further comprises an coupling portion 310 for coupling the manifold to another manifold through, for example, a coupling line which can include a valve assembly to, for example, control liquid flow between the manifolds.

In preferred embodiments, a manifold comprises a manifold line of one-half inch copper tubing and each heater connection fitting comprises a brass boss having one-half inch bores and two circumferential indents each for seating an one-half inch O-ring to provide a seal against the inlet channel or outlet channel of a liquid heater when the liquid heater is seated thereon. Preferably, the O-rings are of buna-n-nitrile, and preferably the heater connection fittings are soldered to the manifold line. The manifold connection fitting preferably comprises a brass boss having a one inch bore and an interconnection portion suitable for accepting a one inch NPT male fitting. In various embodiments including a coupling line, preferably the coupling line is three-quarter inch copper tubing and the coupling portion utilizes a one inch buna-n-nitrile O-ring to circumferentially seal against the coupling line.

Referring to FIGS. 4A–4D, in various embodiments, a liquid heater 400 comprises a housing 401 having a liquid inlet 402, a liquid inlet channel 404 integrally including the liquid inlet 402, cross channels 406, 408 communicating with a central channel 409, a liquid outlet 410, and a liquid outlet channel 412 integrally including the liquid outlet 410. The liquid heater further comprises a heater cartridge 414 which preferably is fully separable from the housing 401 and capable of being removed and replaced without disconnecting the housing 401 from the inlet and outlet manifolds. Preferably, the heating cartridge 414 is releasably secured to the liquid heater housing 401 by removable fastener inserted in securement openings 413 (e.g., passages for bolts, threaded holes for screws), and it can be seen in FIGS. 1 and 4A–4D that the heater cartridge 414 can be readily released from the liquid heater without disturbing the existing mounting of the liquid heater and its plumbing connections to the inlet and outlet manifolds.

The heater cartridge 414 comprises termination rods 418, 420 for electrically connecting an electrical resistance heating element 421 to a switching unit, and can further include an electrically insulative element divider 419. The electrical resistance heating element 421 is connected by fasteners 422 (e.g., screws) to members 423a, 423b, which are connected to their respective termination rods and which provide a flat surface portion for better securement against the member and better electrical contact between the electrical resistance heating element 421 and the member than a curved surface. The termination rods 418, 420 are supported by a heater cartridge head 424 having head portion indents 426, 428 for seating O-rings, which become radially compressed and seal the cartridge head 424 against the walls of the central channel at the proximate end 429 of the housing 401 when the heater cartridge 414 is inserted into the central channel 409.

The heater cartridge 414 further comprises a web 430 having a proximate end 431 connected to the cartridge head 424 and an electrically conductive member 432 at the distal end. The web 430 and electrically conductive member 432 define in the central channel 409 successive first and second interior channels 434a, 434b in fluid communication, respectively, with the liquid inlet channel 404 and the liquid outlet channel 412. In preferred embodiments, the electrical resistance heating element 421 is arranged in a generally U-shaped configuration, bridging about the distal end of the web 430. This bridging by a portion of the electrical resistance heating element places this portion 438 under mechanical stress and defines a mechanically stressed portion 438 of the electrical resistance heating element 421. The electrically conductive member 432 is disposed on the distal end of the web 430 in electrical contact with at least a portion of the electrical resistance heating element preceding and with a portion following the mechanically stressed portion 438 to shunt current flow across the electrically conductive member 432 and thereby substantially eliminate the electrical current flow through the mechanically stressed portion bridging the distal end of the web 430.

Preferably, the electrical resistance heating elements are continuous, sheathless, coils. Preferred electrical resistance heating elements materials include, but are not limited to, nickel-chromium alloys, and iron-chromium-aluminum alloys. Examples of suitable commercially available wire for utilization in electrical resistance heating elements include NIKROTHAL 80 PLUS (an 80/20 NiCr alloy wire manufactured by Kanthal International, Hallstahammar, Sweden and available from Kanthal Bethel, Bethel, Conn., USA), NICR-A (an 80/20 NiCr alloy wire manufactured by National Element Inc., North Carolina, USA), KANTHAL-D (a FeCrAl alloy wire manufactured by Kanthal), and FECRAL815 (a FeCrAl alloy wire manufactured by National). Preferred wire B&S gauges ranges from about 20 (about 0.0320 inch diameter wire) to about 25 (about 0.0179 inch diameter wire) depending on the wire material, operating voltage, current and power.

In specific applications, the desired power dissipation of an electrical resistance heating element can vary typically from about 2.4 to 10.5 kilowatts (kW). In these various applications, the wire diameter of an electrical resistance heating element is preferably selected to maintain a safe "watt-density" (e.g., watts per inch squared) during operation and facilitates maintaining a constant range of power per surface area during operation. Various examples of water temperature rises provided by various embodiments of the present invention substantially similar to those illustrated in FIGS. 1–3 using liquid heaters substantially similar to that of FIGS. 4A–4D, for various values of electrical resistance heating element and operational parameters, are listed in Tables 1 and 2 below.

TABLE 1

| Volts | Total kW | Amps per Phase | Temperature Rise ° F. first plurality of heaters | | | |
|---|---|---|---|---|---|---|
| | | | 6 gpm flow | 7.5 gpm flow | 8 pgm flow | 10 gpm flow |
| 480 Y/277 V | 36 | 43 | 41 | 32 | 30 | 24 |
| 480 Y/277 V | 48 | 58 | 54 | 43 | 41 | 32 |
| 480 Y/277 V | 54 | 65 | 61 | 49 | 46 | 36 |
| 480 Y/277 V | 63 | 76 | 71 | 57 | 53 | 43 |
| 208 V/3 phase | 36 | 100 | 41 | 32 | 30 | 24 |
| 208 V/3 phase | 48 | 133 | 54 | 43 | 41 | 32 |

TABLE 2

| Volts | Total kW | Amps per Phase | Temperature Rise ° F. | | | | |
|---|---|---|---|---|---|---|---|
| | | | first plurality of heaters | | w/ second plurality of heaters | | |
| | | | 6 gpm flow | 7.5 gpm flow | 10 gpm flow | 20 gpm flow | 23 gpm flow |
| 480 Y/277 V | 72 | 87 | 41 | 33 | 50 | 25 | 21 |
| 480 Y/277 V | 96 | 116 | 55 | 44 | 66 | 33 | 28 |
| 480 Y/277 V | 108 | 130 | 61 | 49 | 74 | 37 | 32 |
| 480 Y/277 V | 126 | 156 | 72 | 57 | 86 | 43 | 37 |
| 208 V/3 phase | 72 | 200 | 41 | 33 | 50 | 25 | 21 |
| 208 V/3 phase | 96 | 267 | 55 | 44 | 66 | 33 | 28 |

Referring again to FIGS. 4A–4D, in preferred embodiments, the liquid inlet 402 of a liquid heater is connected to an inlet manifold by inlet heater connection fitting 442, and the liquid outlet 410 of a liquid heater is connected to an outlet manifold by outlet heater connection fitting 444. The heater connection fittings having indents 446a, 446b, 448a, 448b for seating O-rings, which upon insertion of the heater connection fittings into the liquid inlet 402 and liquid outlet 410, become radially compressed and seal, respectively, the inlet heater connection fitting 442 in the liquid inlet channel 404 and the outlet heater connection fitting 444 in the liquid outlet channel 412.

In preferred embodiments, the liquid heater 400 includes a flow sensor 450 operably disposed in the liquid inlet channel 404 and responsive to the flow rate of liquid through the liquid inlet channel 404, the flow sensor 450. Preferably, the flow sensor 450 comprises a rotometer including a magnetic portion 451 slidably disposed in the liquid inlet channel 404, and travel stops 452, 453. In operation, liquid flow through the liquid inlet channel 404 of a sufficient flow rate forces the magnetic portion 451 towards the downstream travel stop 452. In preferred embodiments, the controller is responsive to the position of the magnetic portion 451 within the liquid inlet channel 404. For example, in various embodiments, at sufficient liquid flow rates through the liquid inlet channel 404 the position of the magnetic portion 451 aligns with one or more magnetically activatable switches of the controller such that the magnetically activatable switches permit the energization of the electrical resistance heating element 421.

It is also preferred that the liquid heater include a temperature sensor, such as, for example, a thermistor. In various embodiments, the housing 401 has a temperature sensor receipt opening 460 in the proximate end of the housing for insertion of a temperature sensor 462 therein, to dispose at least a portion of the temperature sensor 462 in the liquid outlet channel 412.

In various embodiments, one or more switching units (such as, for example, triacs) are supported on the liquid heater housing 401 and in fluid communication with the liquid inlet channel 404 to assist in preventing overheating of the switching unit. In one embodiment, housing 401 has side openings 472, 474 formed in a sidewall thereof and a mounting plate 476 for mounting the switching units, the mounting plate 476 having plate openings 478, 480 and bolt securement passages 482 adjacent same for securing switching units thereto.

The liquid heater further preferably includes a pressure relief valve incorporated in the housing. Referring to FIGS. 4A–4D, in various embodiments, the pressure relief valve comprises a valve mechanism seated in a passage 490 in the housing 401, which is in fluid communication with the liquid inlet channel 404. In preferred embodiments, the pressure relief valve is a re-setable valve mechanism having a spring-loaded brass piston and seat. In various embodiments where the housing is rated for a maximum operating pressure of 150 psi, the pressure relief valve is preferably set to start actuation at 170 psi.

Figure 5A:
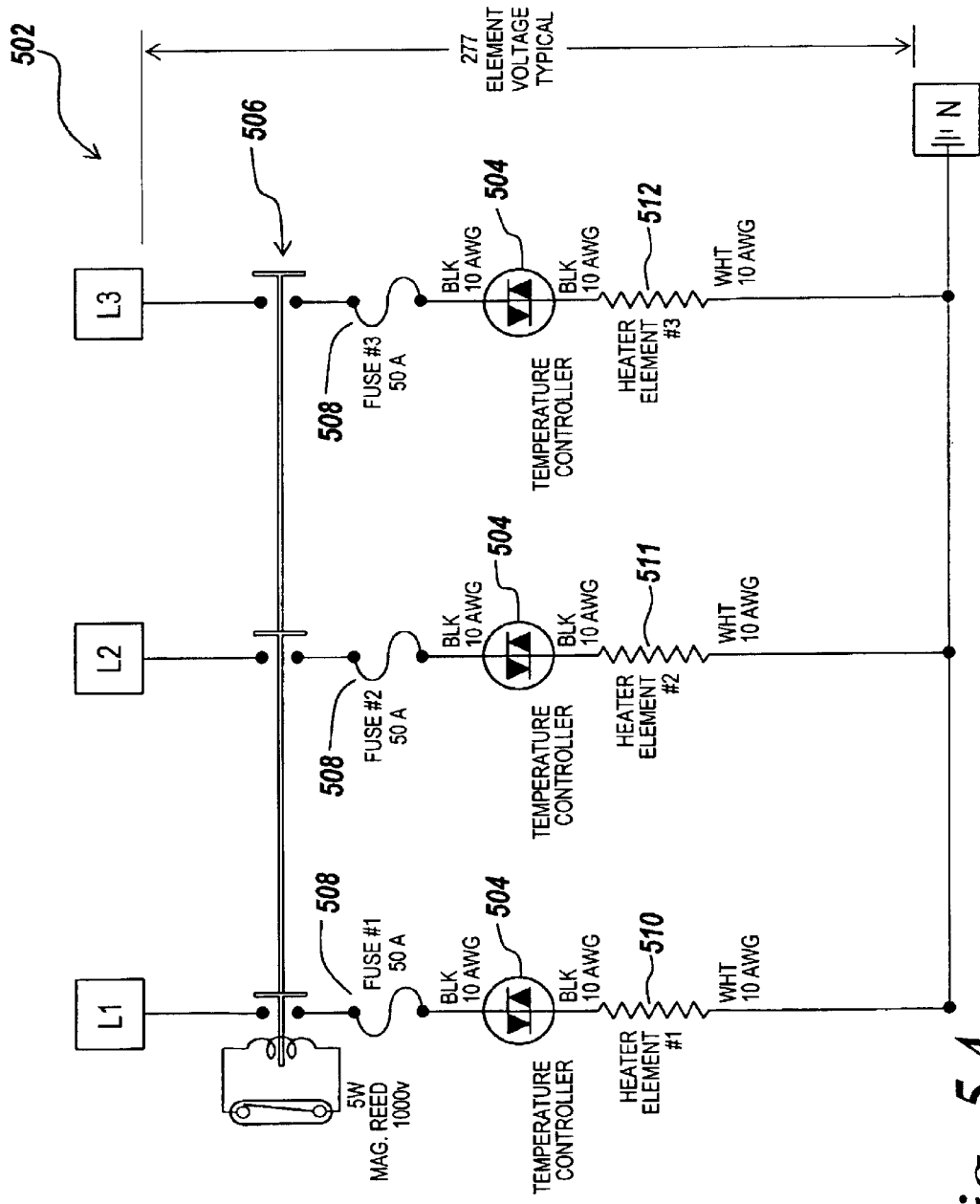
FIGS. 5A and 5B are schematic electrical diagrams of various embodiments of main electrical connection terminal for one or more switching units for an electric tankless liquid heater system in accordance with the present invention.
Figure 5B:
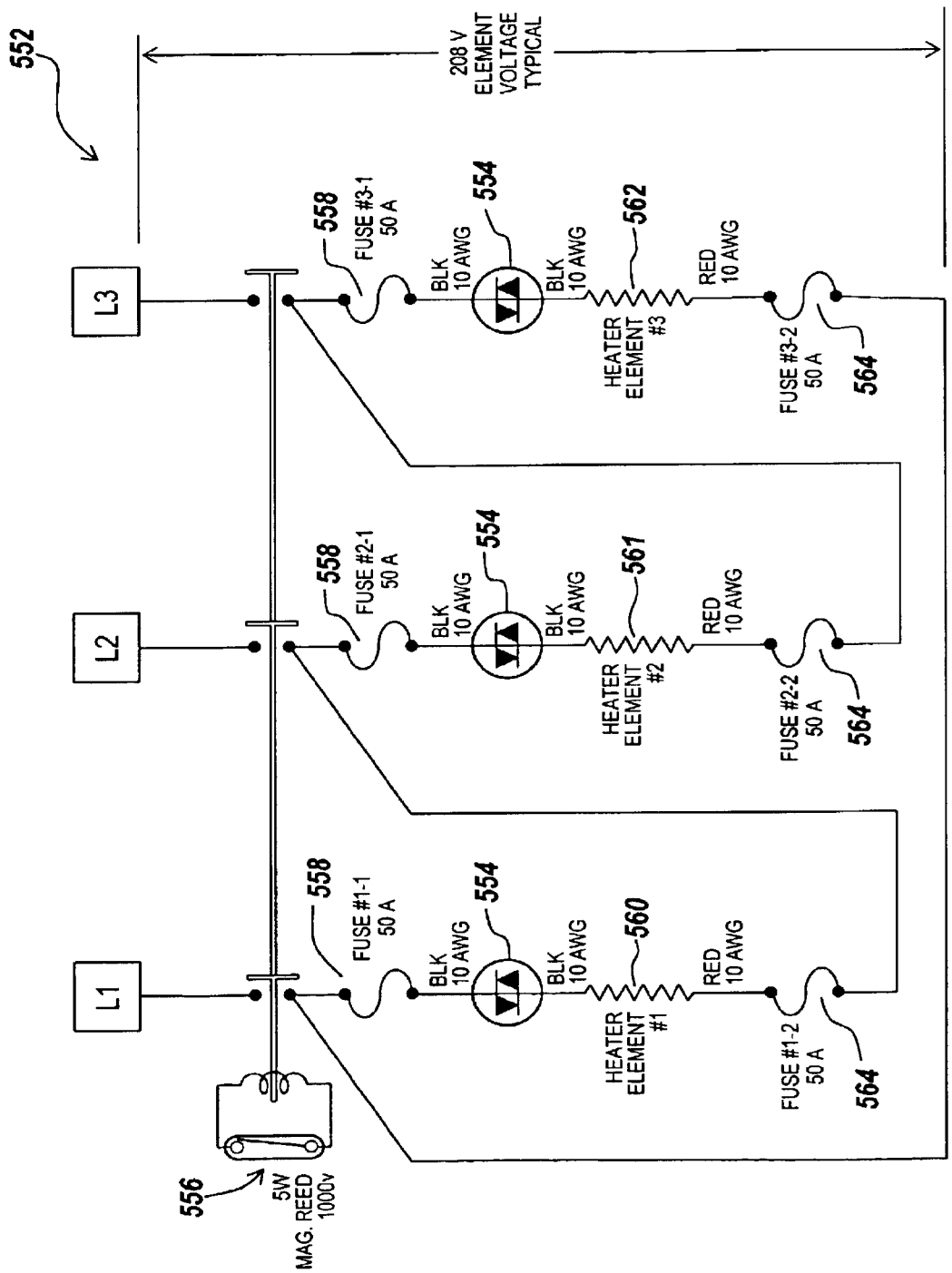

FIGS. 5A and 5B schematically illustrate various embodiments of main electrical connection for switching units in series with a circuit relay for a liquid heater system in accordance with the present invention. FIG. 5A illustrates a Wye configuration 502 for connecting multiple switching units 504 (here triacs) to line voltage L1, L2, L3 (3 phase AC) and a ground N. The configuration illustrated is for a typical 277 volt (V) application. The switching units 504 are electrically connected to line voltage L1, L2, L3 through a circuit relay 506 (such as, e.g., a 1000 V magnetic reed switch) and a fuse 508 (which, in the illustrated application, is preferably a 50 ampere (A) fuse). The switching units 504 are in turn electrically connected to a respective electrical resistance heating element 510, 511, 512 of a liquid heater (here, one element per liquid heater) and the circuit completed by electrical connection to a ground N.

FIG. 5B illustrates a delta configuration 552 for connecting switching units 554 (here triacs) in series with a circuit relay 556 to line voltage L1, L2, L3 (3 phase AC). The configuration illustrated is for a typical 208 V application. The switching units 554 are electrically connected to line voltage L1, L2, L3 through a circuit relay 556 (such as, e.g., a 3 watt (W), 1000 V magnetic reed switch) and a first fuse 558 (which, in the illustrated application, is preferably a 50 A fuse). The switching units 554 are in turn electrically connected to a respective electrical resistance heating element 560, 561, 562 of a liquid heater (here, one element per liquid heater). The circuit is completed for each electrical resistance heating element 560, 561, 562 by electrical connection to another phase of the line voltage through a second fuse 564, which, in the illustrated application, is preferably a 50A fuse.

In preferred embodiments, the tankless liquid heater of the present invention includes a controller, which provides thermostatic control, for example, by monitoring liquid outlet temperature and flow rate and adjusting the energization of liquid heaters and the current flow to the electrical resistance heating elements.

Preferably, the controller also regulates a circuit relay installed in series with the switching unit to, for example, increase dielectric strength and with the ability to disarm the switching unit when the flow rate as sensed by a flow sensor is below a predetermined threshold value.

Figure 6:
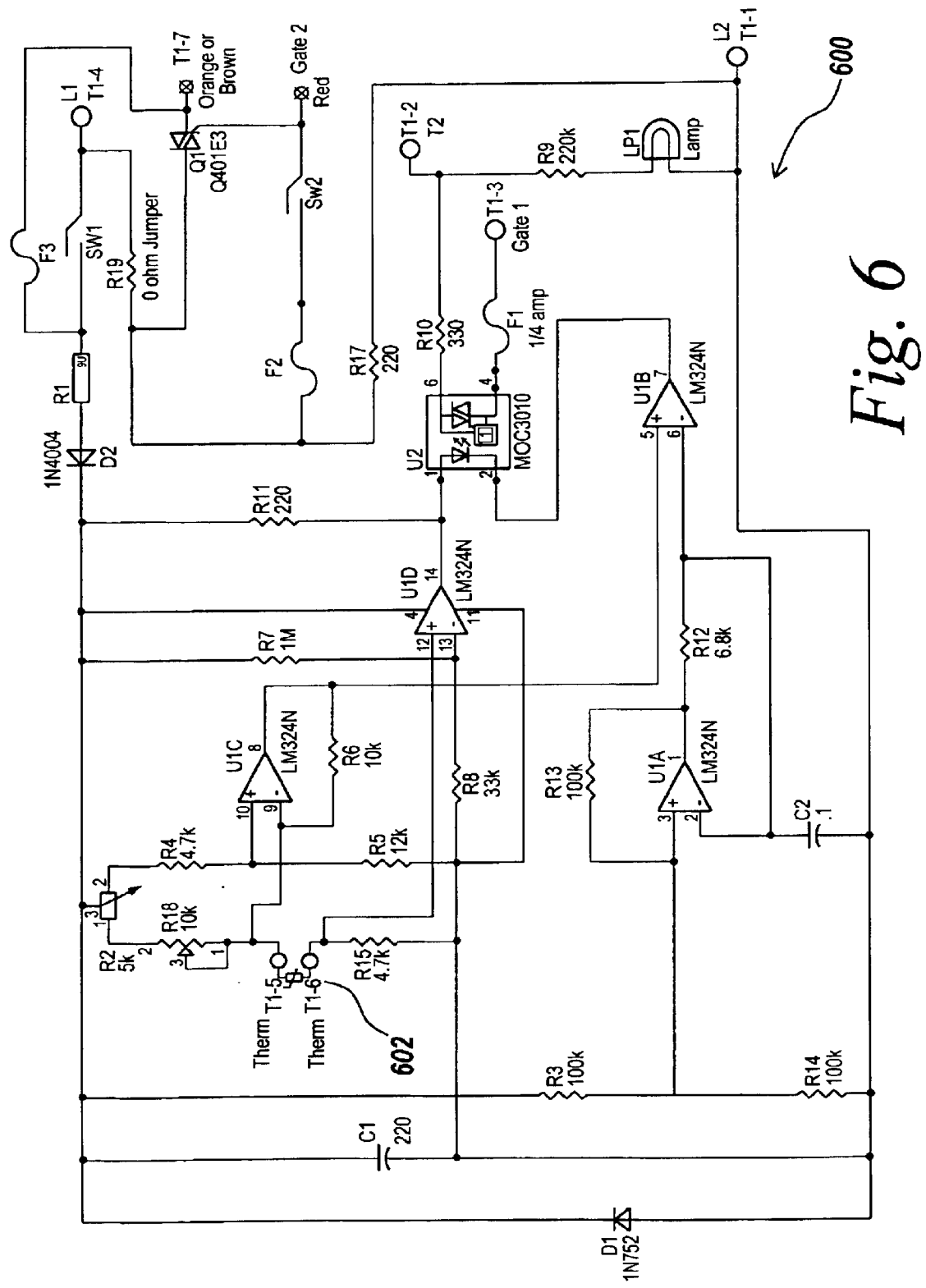
FIG. 6 is a schematic electrical circuit diagram of various embodiments of a controller for an electric tankless liquid heater system in accordance with the present invention.

Referring to FIG. 6, various embodiments of a controller are illustrated. Further details of the electrical components of FIG. 6 are provided in Tables 3 and 4 for two exemplary versions. In the schematic of FIG. 6, the control circuit 600 provides a control signal to one or more switching units on Gate 1 T1-3 and a control signal to one or more circuit relays on T1-7. It can be seen that the control signal for the one or more switching units is regulated by a trigger device U2 (here an optical coupler) which is triggered (here the light emitting diode is driven when triggered) in response to a signal from a temperature sensor 602 (here a thermistor). Typically, the trigger device is configured to turn the switching unit on at the zero-crossing to minimize radio frequency interference.

In operation, the temperature sensor 602 senses the liquid temperature producing a signal, which is conditioned and amplified, and provided to the trigger device U2 (across pins 1 and 2 for the specific application illustrated using a MOC3010, ZCross Optocoupler from Motorola, Inc.). If the liquid temperature is adequately high for the selected temperature point (as controllably established by resistor R18), the control signal on output Gate 2 T1-3 will not cause the associated switching unit to energize the one or more electrical resistance heating elements connected thereto. In addition, if the liquid flow rate as sensed by the flow sensor is below a predetermined threshold level, the relay switches SW1 and SW2 will remain open, resulting in a control signal on T1-7 which causes the circuit relay to remain open and prevents current flow to the associated electrical resistance heating elements.

When the liquid temperature as sensed by the temperature sensor 602 falls below the temperature set point, the trigger device U2 is triggered (here, e.g., the light emitting diode emits), generating a control signal on output Gate 2 T1-3 permitting the associated switching unit to energize. However, for current flow to reach the one or more electrical resistance heating elements associated with the switching unit, the liquid flow rate, as sensed by the flow sensor, must also be equal to or above a predetermined threshold level to close the relay switches SW1 and SW2, resulting in a control signal on T1-7 which causes the circuit relay to close and permits current flow to the switching unit and associated electrical resistance heating elements. For example, in various embodiments where the flow sensor comprises a rotometer including a magnetic portion configured to slidably respond to the liquid flow rate through a liquid heater, liquid flow through the liquid heater of equal to or above a predetermined flow rate threshold forces the magnetic portion to slide into an alignment with the relay switches SW1 and SW2 such that the switches close, permitting the energization of the associated electrical resistance heating element. The flow sensor thus providing a signal to the controller via the magnetic force exerted by the magnetic portion on the the relay switches SW1 and SW2.

As will be see from the foregoing discussion and the drawings, the invention provides a system for heating a liquid, such as, for example, water, comprising a plurality of liquid heaters, the inlets and outlets of which are respectively connected in a parallel flow relationship by respective manifolds, and configured to provide liquid having a temperature of greater than about 90 degrees Fahrenheit at a flow rate of greater than about 10 gallons per minute. In various embodiments, the present invention provides an electric tankless liquid heater system capable of delivering hot liquids, and in particular water, at even higher flow rates and or temperatures, including, but not limited to, flow rates greater than about: (1) 12 gpm; (2) 18 gpm; (3) 20 gpm; and (5) 20 gpm; and/or temperatures of greater than about: (1) 100° F.; (2) 120° F.; (3) 140° F.; and (4) 180° F. Accordingly, in various embodiments, the present invention provides tankless water heaters systems for provisional of domestic hot water, industrial process hot water, eye/face washers, drench showers, and decontamination showers.

TABLE 3

| Element | Device | Value, Version 1 | Value, Version 2 |
|---|---|---|---|
| C1 | Capacitor | 22 ufd/10 v | 220 ufd/10 v |
| C2 | Capacitor | 0.1/50 v | 0.1/50 v |
| D1 | Zener Diode | 1N752 | 1N752 |
| D2 | Diode | 1N4004 | 1N4004 |
| F1 | MCR-Fuse | 0.25 A | 0.25 A |
| F2 | MCR-Fuse | 0.25 A | not present |
| F3 | MCR-Fuse | not present | 0.25 A |
| LP1 | Neon Lamp | 2 ml LAMP | 2 ml LAMP |
| Q1 | 1A Triac | Q4 01E3 | Q4 01E3 |
| R1 | Power Resistor | see Table 2 below | see Table 2 below |
| R2 | Potentiometer | 5k | 5k |
| R3 | Resistor ¼ W 5% | 100k | 100k |
| R4 | Resistor ¼ W 5% | 4.7k | 4.7k |
| R5 | Resistor ¼ W 5% | 12k | 12k |
| R6 | Resistor ¼ W 5% | 10k | 10k |
| R7 | Resistor ¼ W 5% | 1M | 1M |
| R8 | Resistor ¼ W 5% | 33k | 33k |
| R9 | Resistor ¼ W 5% | 220k | 220k |
| R10 | Resistor ¼ W 5% | 330 | 330 |
| R11 | Resistor ¼ W 5% | 220 | 220 |
| R12 | Resistor ¼ W 5% | 6.8k | 6.8k |
| R13 | Resistor ¼ W 5% | 100k | 100k |
| R14 | Resistor ¼ W 5% | 100k | 100k |
| R15 | Resistor ¼ W 5% | 4.7k | 4.7k |
| R17 | Resistor ¼ W 5% | 220 | not present |
| R18 | Potentiometer | 10k | 10k |

TABLE 3-continued

| Element | Device | Value, Version 1 | Value, Version 2 |
|---|---|---|---|
| R19 | Resistor ¼ W 5% | 0 ohm | 0 ohm |
| SW1 | Reedswitch | HYR2016 | HYR2016 |
| SW2 | Reedswitch | HYR2016 | not present |
| T1 | EDS500V-06-P-M | T-Block | T-Block |
| U1 | LM324N | LM324N | LM324N |
| U2 | ZCross Optocoupler | MOC3010 | MOC3010 |

TABLE 4

| Voltage | R1 Values |
|---|---|
| 120 V | 2.4k, 5 W |
| 208–240 V | 5k, 5 W |
| 277 V | 6.2k, 5 W |

The claims should not be read as limited to the described order or elements unless stated to that effect. While the invention has been particularly shown and described with reference to specific illustrative embodiments, it should be understood that various changes in form and detail may be made without departing from the spirit and scope of the invention as defined by the appended claims. By way of example, any of the disclosed features can be combined with any of the other disclosed features to a produce an electric tankless liquid heater. Therefore, all embodiments that come within the scope and spirit of the following claims and equivalents thereto are claimed as the invention.

What is claimed is:

1. A tankless liquid heater comprising:
   a first inlet manifold;
   a first outlet manifold;
   a first plurality of liquid heaters each having a liquid inlet and a liquid outlet, the liquid inlets of the first plurality of electric liquid heaters being connected in a parallel flow relationship by the first inlet manifold, the liquid outlets of the first plurality of electric liquid heaters being connected in a parallel flow relationship by the first outlet manifold;
   a second inlet manifold;
   a second outlet manifold;
   a second plurality of liquid heaters each having a liquid inlet and a liquid outlet, the liquid inlets of the second plurality of electric liquid heaters being connected in a parallel flow relationship by the second inlet manifold, the liquid outlets of the second plurality of electric liquid heaters being connected in a parallel flow relationship by the second outlet manifold; and
   a valve assembly joining the first inlet manifold to the second inlet manifold, the valve assembly containing a valve configured to open and permit liquid flow into the second inlet manifold in response to a difference in liquid pressure between the first inlet manifold and the second inlet manifold,
   wherein each of the first plurality of liquid heaters and each of the second plurality of liquid heaters having one or more electrical resistance heating elements for heating liquid flowing through said liquid heater, and wherein the first plurality of liquid heaters and second plurality of liquid heaters are configured such that the tankless liquid heater is capable of delivering liquid having a temperature of greater than about 90 degrees Fahrenheit at a flow rate of greater than about 12 gallons per minute.

2. The tankless liquid heater of claim 1, wherein the first plurality of liquid heaters comprises 6 or more liquid heaters and the second plurality of liquid heaters comprises 6 or more liquid heaters.

3. The tankless liquid heater of claim 1, wherein the plurality of liquid heaters are configured such that the tankless liquid heater is capable of delivering liquid having a temperature of greater than about 90 degrees Fahrenheit at a flow rate of greater than about 18 gallons per minute.

4. The tankless liquid heater of claim 1, wherein the plurality of liquid heaters are configured such that the tankless liquid heater is capable of delivering liquid having a temperature of greater than about 90 degrees Fahrenheit at a flow rate of greater than about 24 gallons per minute.

5. The tankless liquid heater of claim 1, wherein the plurality of liquid heaters are configured such that the tankless liquid heater is capable of delivering liquid having a temperature of greater than about 140 degrees Fahrenheit at a flow rate of greater than about 12 gallons per minute.

6. The tankless liquid heater of claim 5, wherein the plurality of liquid heaters are configured such that the tankless liquid heater is capable of delivering liquid having a temperature of greater than about 140 degrees Fahrenheit at a flow rate of greater than about 20 gallons per minute.

7. The tankless liquid heater of claim 1, wherein the one or more electrical resistance heating elements are sheathless.

8. The tankless liquid heater of claim 1, wherein the one or more electrical resistance heating elements each include a mechanically stressed portion and an electrically conductive member configured to substantially eliminate electrical current flow through the mechanically stressed portion.

9. The tankless liquid heater of claim 1, wherein each of the first plurality of liquid heaters comprise:
   a housing having a liquid inlet channel integrally including the liquid inlet and a liquid outlet channel integrally including the liquid outlet, the housing defining a central passage opening into an exterior housing surface; and
   a heating cartridge resident in the central passage, the heating cartridge supporting interiorly of the housing the one or more electrical resistance heating elements.

10. The tankless liquid heater of claim 9, wherein one or more of the first plurality of liquid heaters further comprise a flow sensor operably disposed in the liquid inlet channel.

11. The tankless liquid heater of claim 10, wherein the flow sensor comprises a rotometer responsive to the flow rate of the liquid through the liquid inlet channel.

12. The tankless liquid heater of claim 10, wherein the flow sensor is configured to provide a signal to a controller, the controller configured to prevent energizing an electrical resistance heating element of the liquid heater until the flow rate of the liquid through the liquid inlet channel exceeds a predetermined flow rate threshold.

13. The tankless liquid heater of claim 9, wherein one or more of the first plurality of liquid heaters further comprise a temperature sensor operably disposed in the liquid outlet channel.

14. The tankless liquid heater of claim 13, further comprising a controller configured to regulate electrical current flow to one or more electrical resistance heating elements in response to a signal produced by the temperature sensor.

15. The tankless liquid heater of claim 1, wherein the plurality of liquid heaters are configured such that the tankless liquid heater is capable of delivering liquid having a temperature of greater than about 120 degrees Fahrenheit at a flow rate of greater than about 12 gallons per minute.

16. The tankless liquid heater of claim 1, wherein the plurality of liquid heaters are configured such that the tankless liquid heater is capable of delivering liquid having a temperature of greater than about 120 degrees Fahrenheit at a flow rate of greater than about 18 gallons per minute.

17. The tankless liquid heater of claim 1, wherein the plurality of liquid heaters are configured such that the tankless liquid heater is capable of delivering liquid having a temperature of greater than about 120 degrees Fahrenheit at a flow rate of greater than about 20 gallons per minute.

18. The tankless liquid heater of claim 1, wherein the plurality of liquid heaters are configured such that the tankless liquid heater is capable of delivering liquid having a temperature of greater than about 120 degrees Fahrenheit at a flow rate of greater than about 24 gallons per minute.

* * * * *